Patented Dec. 8, 1953

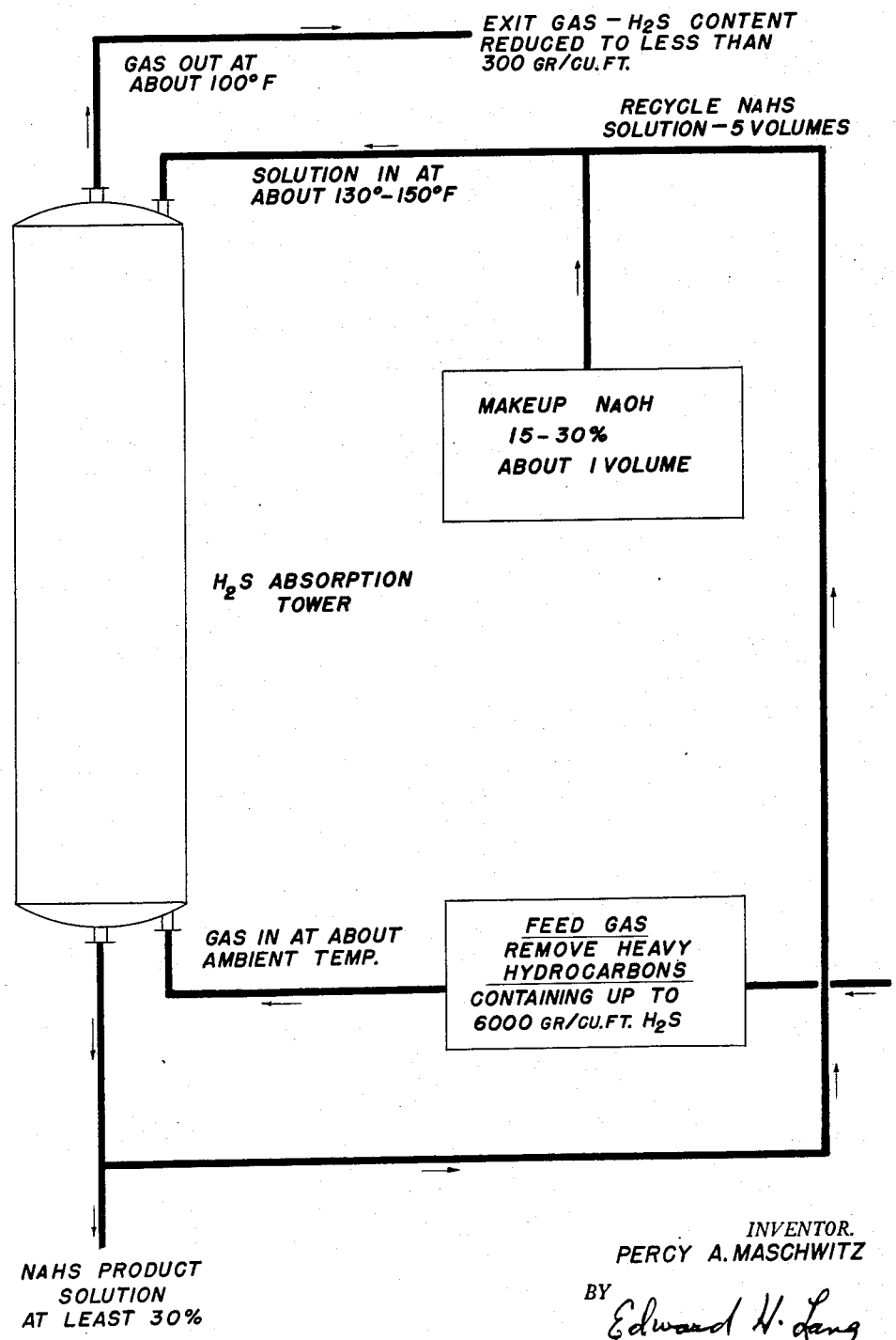

2,662,000

UNITED STATES PATENT OFFICE 2,662,000

PROCESS FOR MANUFACTURING SODIUM HYDROSULFIDE SOLUTION

Percy A. Maschwitz, Flossmoor, Ill., assignor to The Pure Oil Company, Chicago, Ill., a corporation of Ohio Application October 19, 1949, Serial No. 122,320

5 Claims. (Cl. 23—134)

1

This invention relates to a method for producing alkali metal sulfides from gas mixtures containing hydrogen sulfide and hydrocarbons and, in particular, to a method of making sodium hydrosulfide solution of high concentration. The gas mixture employed may be a typical natural gas or a gas resulting from a thermal cracking operation in a refinery, which will contain hydrogen sulfide and light hydrocarbons.

Trade requirements for useful sodium hydrosulfide are that it be available in rather concentrated solution, which means solutions containing 25 per cent or more of the sodium hydrosulfide by weight. Consequently, the processes for the preparation of sodium hydrosulfide solutions require balanced control in operation. In spite of the simplicity of the reaction by which sodium hydroxide can be converted to alkali metal sulfides, a complexity is introduced into the process because of the relative insolubility of the sulfide compared with the hydrosulfide. The direct contact of hydrogen sulfide with a sodium hydroxide solution strong enough to produce a 25 to 30 per cent hydrosulfide solution causes the precipitation of sulfide at normal temperatures clogging apparatus ordinarily employed in a continuous process.

Accordingly, it is a fundamental object of the instant invention to provide a continuous though simple operation for the production of sodium hydrosulfide solutions having concentrations of the order of 25 to 30 per cent or more.

It is a second object of the instant invention to provide a method for the production of sodium hydrosulfide which is adaptable for use as an auxiliary process in operations where gas mixtures, particularly gas mixtures containing hydrogen sulfide and hydrocarbons, are produced.

Other objects and advantages of the instant invention will in part be obvious and in part appear hereinafter.

In this method of producing sodium hydrosulfide for example, continuous contact between a stream of gas containing hydrogen sulfide and a stream of sodium hydrosulfide solution to which sodium hydroxide has been added is maintained. The absorption is carried out with solutions at a moderately elevated temperature in the range of 90° to 150° F., so that full advantage is taken of the increased solubility of sodium sulfide in the process. To accomplish evaporation of water and develop a concentrated solution of the sodium hydrosulfide to be withdrawn from the contacting apparatus, the operation is carried out in an absorption tower preferably packed for the better contact of reagents and under flow conditions such that the volume of gas is considerably greater than the volume of liquid contacted.

In operating with a packed tower, feed hydrocarbon gas carrying hydrogen sulfide enters near the bottom and leaves through the top of the tower where there is fed sodium hydroxide solution intermixed with sodium hydrosulfide solution, so that contact at the top of the tower is between gas containing a reduced amount of hydrogen sulfide and the makeup solution carrying sodium hydrosulfide. From the bottom of the tower, there is withdrawn a fraction of the absorption solution as finished sodium hydrosulfide solution, while the remainder is fed back to join the makeup stream in the tower. The concentration of the solution is balanced and the temperature in the tower maintained so that at no time will a concentration of sodium sulfide occur in the solution which will result in the precipitation of solid sodium sulfide in the packing. Normally, it is advisable to keep the rate of solution flow such that the ratio of the volume of sodium hydrosulfide recycle to volume of fresh sodium hydroxide solution is about 5 to 1 or greater. By employing a large volume of gas, an advantage accrues from its contact with the relatively small volume of solution because the agitation of the solution in the tower induces a certain amount of evaporation effecting a concentration of the solution within the tower. When such conditions of operation are followed, it is found that sodium hydroxide solutions of weaker concentrations can be used as makeup and the necessity for heated storage eliminated.

In the drawing accompanying the instant specification, the figure is a flow sheet showing the process in diagrammatic form.

In the figure, there is presented a flow diagram based on the assumption that conventional gas absorption tower equipment is to be used in the process, and for that reason emphasis has been placed on outlining the operating conditions in the flow diagram, rather than to indicate an arrangement of apparatus. Operation can be started with a sodium hydrosulfide solution or sodium hydroxide solution. It will be seen that feed gas containing hydrogen sulfide first can be conducted to a condenser or pretreatment unit of any conventional form to remove any heavy hydrocarbons, from whence it can pass to the gas absorption tower to meet a down-flowing stream of absorption solution. Normally, the feed gas would be at atmospheric pressure or sufficiently above to keep it flowing through the tower, but elevated pressures up to several atmospheres can be used where it is deemed economical so to do. Taken from the bottom of the tower is the sodium hydrosulfide solution which, under the conditions of the operation outlined, will contain at least about 30 per cent of sodium hydrosulfide and only traces of sulfide and carbonate. A sufficient volume is recycled to the top of the tower with a certain amount of preheating and about 20 per cent or less of makeup sodium hydroxide to contact the gas in the tower. The volume rate of flow of solution is matched against the rate of flow of gas so that about 1 to 25 gallons of solution passes through the tower for contact with each 1000 cubic feet of gas. Under such conditions of operation, where a large volume of gas contacts a relatively small volume of solution, evaporation is carried on in the tower to an extent sufficient to make it possible to withdraw sodium hydrosulfide solutions of a concentration greater than 30 per cent.

Because sodium hydrosulfide-sodium sulfide solutions display certain peculiarities, it is necessary to maintain controls over the flow rates of the absorption solution and gas being treated to carry out a successful process for the preparation of sodium hydrosulfide. This is best illustrated by a general example describing the controls to be practiced in carrying out the process. The absorption tower should be fed with a solution containing about 25 to 30 per cent by weight of solids in solution, of which not more than about half should be sodium sulfide formed by the addition of free sodium hydroxide to sodium hydrosulfide recycle solution. The incoming gas containing the hydrogen sulfide is introduced at the bottom of the tower and in its countercurrent contact with the absorpion solution forms sodium hydrosulfide, thereby reducing the concentration of sulfide and preventing precipitation of sodium sulfide. A substantial proportion of hydrogen sulfide is extracted and a concentrated sodium hydrosulfide solution leaves the tower. At the top of the tower, the lean gas, that which has had a substantial fraction of its hydrogen sulfide removed, leaves the tower at a point shortly above the absorption solution inlet. The formation of solid sodium sulfide in the tower is avoided by maintaining sufficient circulation of hydrosulfide solution relative to sodium hydroxide makeup that the saturation point of the mixed solutions for sulfide is never reached. The application of external heat is normally unnecessary, unless it is desired to increase the concentration of the product by promoting the evaporation of water. The appetency of the absorption solution for hydrogen sulfide is such that where it is maintained in contact with excess hydrogen sulfide, the equilibrium between the gas flow and crystallization tendency is maintained and the solution is kept on the side of sodium hydrosulfide with no tendency toward precipitation of sodium sulfide apparent.

With the proper balancing of flow rates, that is, withdrawing the absorption solution from the tower only when the sodium hydrosulfide has reached a desired concentration of about 30 per cent or greater and maintaining a generous flow of gas through the tower, about 1000 cubic feet to 1 up to 25 gallons of solution, an additional advantage is derived from the large volume flow of gas and the elevated temperature thereof, for it helps to prepare the sodium hydrosulfide at desired concentration. A certain amount of evaporation is carried out in the tower, thereby to effect a concentration of the sodium hydrosulfide solution in the process. Therefore, where a large volume of gas is maintained flowing against a relatively small volume of absorption solution, the heat of neutralization of the reaction and also sensible heat carried by the liquid are utilized in the tower to effect some evaporation in the tower.

As a specific example of the method of carrying out the process, the following represents a typical set of operating conditions:

*Example I.*—Refinery gas, at about 150 pounds per square inch pressure, containing largely methane and ethane with a few heavier hydrocarbons in minor amount and containing hydrogen sulfide in the amount of 840 grains per 100 cubic feet, is passed up through a tower at the rate of about 170,000 cubic feet per hour countercurrent to a solution for the absorption of the hydrogen sulfide circulated at the rate of about 1,800 gallons per hour and at a temperature of about 100° to 150° F. The solution in the tower flowing at the rate of about 1,800 gallons per hour, is made up of fresh sodium hydroxide solution, added at a rate of about 60 gallons per hour, and recycle solution being fed at the rate of about 1740 gallons per hour. This solution is passed into the tower at a temperature of about 130° F. and is withdrawn from the tower at about 120° F., containing sodium hydrosulfide normally in excess of 30 per cent by weight and with only traces of sodium sulfide. The gas which enters the tower at about 80° F. leaves the tower at about 110° F., and generally will have been stripped of 70 per cent or more of the hydrogen sulfide contained therein. The level to which the hydrogen sulfide is removed from the gas is determined by the use to which the gas is to be put and the economics of attempting to perform quantitative absorption. A gas containing less than 300 grains of hydrogen sulfide per 100 cubic feet is commercially acceptable.

Though the normal conditions for operation involve using a gas at about atmospheric pressure, considerably higher pressures can be used as illustrated by Example II.

*Example II.*—Refinery gas containing 280 grains of hydrogen sulfide per hundred cubic feet is fed at about 80° F. to an absorption tower at the rate of 1,500,000 cubic feet per day, the volume being stated at standard conditions. With the gas pressure at 10 atmospheres and the exit temperature of the gas at 105°, it will contain about 150 grains of hydrogen sulfide per 100 cubic feet. By contacting the gas within the tower with an absorption solution at the rate of 1 gallon per minute, made up of 0.8 gallon of sodium hydrosulfide solution produced in the tower and 0.2 gallon of fresh caustic solution having a strength of 30° Baumé, about 0.2 gallon per minute of sodium hydrosulfide solution of 31 per cent by weight is produced. Under these conditions, the amount of water evaporated is about 0.03 to 0.04 gallon per minute, and the feed rates are such that the ratio is about 1 gallon of liquid per 1,000 cubic feet of gas. Analysis of these operating conditions by way of material and heat balance, will show that they are such as to maintain in the absorption solution less than half the solid content as sodium sulfide at the inlet end of the tower and effect a substantially quantitative conversion to sodium hydrosulfide. Also, the temperatures of the inlet and outlet gas, and the inlet and outlet solutions, are such that in combination with a large excess of gas, an amount of water is evaporated which is at least equivalent to the amount of water formed in the neutralization reaction in the tower.

*Example III.*—A similar result can be obtained when the gas is fed into the absorption tower at atmospheric pressure as the following set of conditions will indicate: 330,000 cubic feet per day of gas, standard conditions, is fed to an absorption tower employing 5 gallons per minute of absorption solution made up of about 4 gallons of recycled sodium hydrosulfide and 1 gallon of 30° Baumé sodium hydroxide. With the hydrogen sulfide content of the feed gas at about 6400 grains per 100 cubic feet, and the hydrogen sulfide content of the exit gas about 250 grains per 100 cubic feet, a sodium hydrosulfide solution containing 31 per cent is produced at the rate of about 1.1 gallon per minute. About 0.15 to 0.2 gallon per minute of water is evaporated in the tower as a consequence of contacting a large volume of gas with a small volume of liquid at the tower temperatures maintained in the range 90° to 150° F. Under these conditions, the ratio of absorption solution to gas is about 22 gallons of solution per 1000 cubic feet of gas, or stated differently, the ratio of gas to absorption solution is about 210.

A material balance on a typical operation, such as that illustrated in Example I, will indicate that under the conditions of operation, the contact of the large volume of gas with the solution accomplishes evaporation of about 5 to 10 per cent of the water used to carry the sodium hydroxide and sodium hydrosulfide into the absorption tower. Similarly, a substantial part of the hydrogen sulfide is removed from the gas and converted to useful sodium hydrosulfide. A commercial product in the form of about 30 per cent sodium hydrosulfide solution is withdrawn from the tower for shipment.

In general, it will be found that sodium hydroxide solutions containing 15 to 30 per cent sodium hydroxide may be used as makeup for the addition of the alkali to the system and that gas containing amounts of hydrogen sulfide to 20 per cent or more can be used. The flow rates should be regulated so that the ratio of gas volume to liquid volume is in the order of about 100 to 10,000 cubic feet of gas per gallon of sodium hydrosulfide solution produced, thereby maintaining the absorption liquid in a high state of agitation to accomplish an efficient absorption and also to bring about the desired amount of evaporation. Thus, it will be seen from the preceding description of the invention that the process is a useful one for the preparation of valuable sodium hydrosulfide solutions, wherein variables which normally contribute to the creation of complicating difficulties in the operation are turned to advantage in helping to avoid problems commonly experienced in preparation of sodium hydrosulfide.

Though the process has been described with several specific examples, it will be understood by those skilled in the art that it is subject to variations within the limits described and that the examples are to be taken as illustrations, rather than limitations thereof.

What is claimed is:

1. A continuous process for the production of sodium hydrosulfide solution which comprises contacting, in an absorption zone, a fresh aqueous absorbent with a gaseous mixture consisting essentially of normally gaseous $C_2$ and $C_3$ hydrocarbons and containing hydrogen sulfide in an amount between about 0.25–20 per cent by weight, in the ratio of about 1–25 gallons of absorbent per 1000 cubic feet of gaseous mixture at operating conditions, said absorbent containing not less than 25 per cent by weight of solutes consisting essentially of sodium hydrosulfide and sodium sulfide, said sodium sulfide being present in an amount insufficient to cause incipient precipitation under operating conditions, at a temperature between about 100–150° F. to produce a spent absorbent containing not less than 25 per cent by weight of sodium hydrosulfide, withdrawing a minor portion of the absorbent from the absorption zone after said contacting, said withdrawn absorbent containing not less than 25 per cent by weight of sodium hydrosulfide, admixing the remaining proportion of the absorbent with an amount of aqueous sodium hydroxide solution insufficient to cause precipitation of sodium sulfide at said temperature to produce the aforementioned fresh absorbent, recycling said fresh absorbent to said absorption zone wherein it is contacted with additional amounts of said gaseous mixture in the aforementioned ratio, continuously repeating the foregoing cycle employing a recycle ratio of not less than about 4:1 while continuously withdrawing from said absorption zone a minor portion of the spent absorbent subsequent to the contacting of the fresh absorbent with hydrogen sulfide thereby continuously producing a concentrated solution containing not less than 25 per cent by weight of sodium hydrosulfide and a gaseous effluent consisting essentially of normally gaseous $C_2$ and $C_3$ hydrocarbons and containing not more than 300 grains of hydrogen sulfide per 100 cubic feet of gaseous effluent at standard conditions.

2. The process in accordance with claim 1 in which the gas contains up to 10 per cent by volume of hydrogen sulfide and is contacted with an absorbent containing about 1 to 12.5 per cent by weight of sodium sulfide.

3. In a continuous process for the production of sodium hydrosulfide from a gaseous mixture consisting essentially of normally gaseous $C_2$ and $C_3$ hydrocarbons and containing hydrogen sulfide in an amount between 0.25–20 weight per cent in an absorption zone operated at a temperature of about 100–150° F. wherein the gaseous mixture is countercurrently contacted with an absorbent containing sodium hydrosulfide and sodium sulfide, the steps which comprise recycling not less than 80 volume per cent of spent absorbent resulting from said contacting, adding a sodium hydroxide solution having a concentration of not greater than 30 per cent by weight of sodium hydroxide to said spent absorbent to produce a fresh absorbent in which about one-fifth to one-half of the solutes is sodium sulfide and maintaining the flow rate of absorbent through the zone such that 1 to 25 gallons of absorbent is contacted with 1,000 cubic feet of gas, and continuously withdrawing not more than 20 volume per cent of spent absorbent from said absorption zone, said spent absorbent comprising an aqueous solution of sodium hydrosulfide containing not less than 30 per cent by weight of sodium hydrosulfide, and a gaseous effluent consisting essentially of normally gaseous $C_2$ and $C_3$ hydrocarbons and containing not more than 300 grains of hydrogen sulfide per 100 cubic feet of gaseous effluent at standard conditions.

4. A method in accordance with claim 3 in which 30° Baumé sodium hydroxide is added to the spent absorbent.

5. A method in accordance with claim 4 in which the sodium hydroxide is added in the ratio of 1 part by volume of sodium hydroxide to 4 parts by volume of spent recycled absorbent.

PERCY A. MASCHWITZ.

References Cited in the file of this patent

UNITED STATES PATENTS

| Number | Name | Date |
| --- | --- | --- |
| 2,346,550 | Border | Apr. 11, 1949 |